US008788449B2

(12) United States Patent
Love et al.

(10) Patent No.: US 8,788,449 B2
(45) Date of Patent: Jul. 22, 2014

(54) INTERFACE FOR CREATING AND EDITING BOOLEAN LOGIC

(75) Inventors: Oriana J. Love, Austin, TX (US);
Irgelkha Mejia, Austin, TX (US);
Borna Safabakhsh, Mountain View, CA (US); Anderson E. Wolfe, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 12/650,974

(22) Filed: Dec. 31, 2009

(65) Prior Publication Data

US 2011/0161272 A1 Jun. 30, 2011

(51) Int. Cl.
*G06F 15/00* (2006.01)
*G06F 15/18* (2006.01)

(52) U.S. Cl.
USPC .......................................................... 706/62

(58) Field of Classification Search
USPC .................................................. 707/E17.062
See application file for complete search history.

(56) References Cited

U.S. PATENT DOCUMENTS

| 5,950,187 | A  | * | 9/1999  | Tsuda                | 1/1     |
|-----------|----|---|---------|----------------------|---------|
| 6,363,374 | B1 | * | 3/2002  | Corston-Oliver et al.| 1/1     |
| 7,251,777 | B1 | * | 7/2007  | Valtchev et al.      | 715/234 |
| 2004/0215612 | A1 | * | 10/2004 | Brody            | 707/3   |
| 2007/0185860 | A1 | * | 8/2007  | Lissack          | 707/5   |
| 2007/0214125 | A1 | * | 9/2007  | Williams         | 707/3   |
| 2007/0276820 | A1 | * | 11/2007 | Iqbal            | 707/4   |
| 2008/0021880 | A1 | * | 1/2008  | Ren et al.       | 707/3   |
| 2008/0071751 | A1 | * | 3/2008  | Keith, Jr.       | 707/3   |
| 2008/0168056 | A1 | * | 7/2008  | Bluvband et al.  | 707/5   |
| 2009/0024917 | A1 | * | 1/2009  | Giannetti        | 715/249 |
| 2009/0077071 | A1 | * | 3/2009  | Mishkanian et al.| 707/5   |
| 2009/0126020 | A1 | * | 5/2009  | Norton et al.    | 726/23  |
| 2009/0187548 | A1 | * | 7/2009  | Ji et al.        | 707/4   |

OTHER PUBLICATIONS

DOC 112: Computer Hardware Lecture 1 [retrieved on Jun. 28, 2013]. Retrieved from the internet :<http://www.doc.ic.ac.uk/~dfg/hardware/HardwareLecture01.pdf>.*
Sourceforge.net, "Boolean Expression Editor for Java", http://sourceforge.net/projects/beej (Date Obtained: Apr. 15, 2009) Last Modified Date: Feb. 16, 2003 , 3 pages.

* cited by examiner

*Primary Examiner* — Kakali Chaki
*Assistant Examiner* — Peter Coughlan
(74) *Attorney, Agent, or Firm* — DeLizio Gilliam, PLLC

(57) ABSTRACT

Boolean graphs and complex non-intuitive editors for authoring complex nested Boolean expressions can result in erroneous evaluation results by relying exclusively on the ability of an author of the Boolean expression to accurately incorporate operands into the Boolean expression to achieve the desired result. Functionality for analyzing the effect of operator changes can be incorporated into an intuitive graphical user interface for authoring the Boolean expression. The impact of the operator changes can be determined based on a position of the operator in the Boolean expression. Multiple evaluation orders for evaluating the operators and their associated operands can also be identified and presented to the programmer to resolve ambiguities, that may arise while evaluating the Boolean expression. The organization of the Boolean expression can be graphically depicted to reflect an evaluation order of the operators and their associated operands that comprise the Boolean expression.

20 Claims, 5 Drawing Sheets

INTERFACE FOR CREATING AND EDITING BOOLEAN LOGIC

BACKGROUND

Embodiments of the inventive subject matter generally relate to the field of computers, and more particularly, to a user interface for creating and editing Boolean logic.

Boolean logic is commonly used to represent data and conditional processes in software. Boolean logic is typically authored by using a combination of operators, operands, and parentheses to denote an order of logic expression evaluation. Visual interfaces for authoring and representing Boolean logic expressions are not predictive and are restricted to graphs and complex non-intuitive editors.

SUMMARY

Embodiments include a method that comprises detecting a manipulation of a Boolean logic interface. A plurality of evaluation orders for a plurality of operands and a plurality of operators that comprise a Boolean expression depicted by the Boolean logic editing interface is determined. The plurality of evaluation orders arises from the manipulation of the Boolean logic interface. It is determined that a first of the plurality of evaluation orders is selected. A graphical depiction of the plurality of operands and the plurality of operators that comprise the Boolean expression is updated to graphically depict the first of the plurality of evaluation orders.

Another embodiment includes a computer program product for creating and editing Boolean logic expressions, where the computer program product comprises a computer readable medium comprising computer readable program code. The computer readable program code is configured to detect a manipulation of a Boolean logic editing interface. The computer readable program code is also configured to determine a plurality of evaluation orders for a plurality of operands and a plurality of operators that comprise a Boolean expression depicted by the Boolean logic editing interface. The plurality of evaluation orders arise from the manipulation of the Boolean logic editing interface. The computer readable program code is also configured to determine a selection of a first of the plurality of evaluation orders. The computer readable program code is further configured to update a graphical depiction of the plurality of operands and the plurality of operators that comprise the Boolean expression to graphically depict the first of the plurality of evaluation orders.

Another embodiment includes a computer program product for authoring Boolean logic expressions, where the computer program product comprises a computer readable medium comprising computer readable program code. The computer readable program code is configured to detect a manipulation of a Boolean logic editing interface. The computer readable program code is configured to determine a plurality of evaluation orders for a plurality of operands and a plurality of operators that comprise a Boolean expression depicted with the Boolean logic editing interface, wherein the plurality of evaluation orders arise from the manipulation. The computer readable program code is also configured to determine a selection of a first of the plurality of evaluation orders. The computer readable program code is further configured to rearrange the plurality of operands and the plurality of operators to graphically depict the first of the plurality of evaluation orders.

Another embodiment includes an apparatus comprising a processor, a network interface coupled with the processor, and a Boolean logic editor. The Boolean logic editor is operable to detect a manipulation of a Boolean logic editing interface. The Boolean logic editor is also operable to determine a plurality of evaluation orders for a plurality of operands and a plurality of operators that comprise a Boolean expression depicted with the Boolean logic editing interface, wherein the plurality of evaluation orders arise from the manipulation. The Boolean logic editor is operable to determine a selection of a first of the plurality of evaluation orders. The Boolean logic editor is further operable to update a graphical depiction of the plurality of operands and the plurality of operators that comprise the Boolean expression to graphically depict the first of the plurality of evaluation orders.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to drop down menus for selecting operators and operands, implementations can utilize text boxes that are validated, radio buttons, etc. In other instances, well-known instruction instances, protocols, structures, and techniques have not been shown in detail in order not to obfuscate the description.

Authoring or editing Boolean expressions, especially complex Boolean expressions with multiple levels of nesting, can be cumbersome. Existing interfaces for creating a complex Boolean expression rely on the ability of a programmer to conceptualize the Boolean expression and determine how operands and constraints can be incorporated into the Boolean expression to achieve the desired result. In creating a complex Boolean expression using the existing interfaces, the order in which the operands in the Boolean expression are evaluated is not clear. An intuitive graphical user interface for creating/editing a Boolean expression that analyzes the effect of operand and operator changes can make it easier for the programmer to create, visualize, and edit the Boolean expression. The graphical user interface can determine the impact of the operator changes based on a position of the operator in the Boolean expression, identify areas of ambiguity that may arise while evaluating the Boolean expression, and present options for resolving the ambiguity. The graphical user interface can graphically depict organization of the Boolean expression to reflect an evaluation order of the operands within the Boolean expression. This can result in a more intuitive process for creating/editing the Boolean expression and reduce or even eliminate errors caused by misinterpretation of the ambiguous complex Boolean expression.

Figure 1:
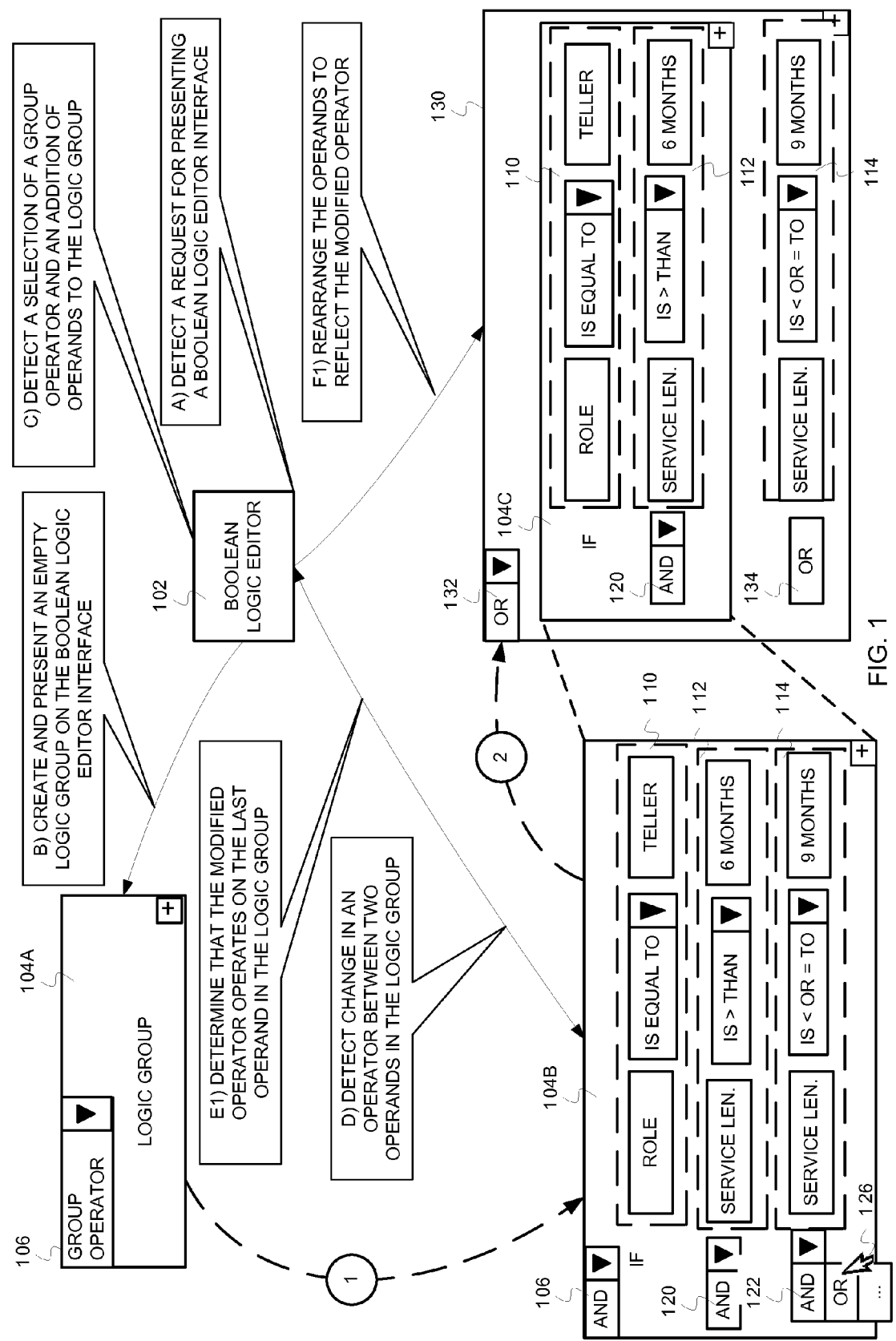
FIG. 1 is an example conceptual diagram illustrating an interface for creating Boolean logic expressions.

FIG. 1 is an example conceptual diagram illustrating an interface for creating Boolean logic expressions. FIG. 1 depicts a Boolean logic editor 102. The Boolean logic editor 102 allows for creating and editing of Boolean expressions. The Boolean logic editor 102 comprises functionality to automatically update graphical depiction of a Boolean expression (e.g., reordering operands and/or operators, changing font size, etc.) to allow intuitive understanding of how the expression is evaluated by visual means At stage A, the Boolean logic editor 102 detects a request for presenting a Boolean logic editor interface (not shown). For example, the Boolean logic editor 102 may detect the request for presenting the Boolean logic editor interface in response to a user launching a Boolean logic editor application. As another example, the Boolean logic editor interface may be presented to allow a user to create an authorization security policy for a system. The Boolean logic editor interface 104A may also be presented to configure search criteria to search for content in a database, on a computer system, across an intranet, across the Internet, etc.

At stage B, the Boolean logic editor 102 creates and presents an empty logic group 104A on the Boolean logic editor interface. The logic group represents a Boolean expression comprising at least one operator (e.g., AND, OR, NOT) and at least one operand. The Boolean logic editor 102 can add one logic group into another logic group and nest the logic groups. The logic group representing an encapsulating expression is herein referred to as an "encapsulating logic group". Evaluating the encapsulating expression represented by the encapsulating logic group yields a Boolean result (e.g., true or false) that can be used to, e.g., present a search result, allow/block resource access, etc. Also, the logic group nested within the encapsulating logic group is herein referred to as a "nested logic group". The nested logic group can be an operand to the encapsulating logic group. Considering an example Boolean expression "(A AND B) OR C", the nested expression "(A AND B)" and operand "C" are inputs (operands) to the "OR" operator. The concept of logic groups can be equated to the concept of parentheses in authoring the Boolean expression by hand. A nested logic group is evaluated first just as a nested logic expression within a pair of parentheses is evaluated before evaluating the encapsulating Boolean expression.

At stage C, the Boolean logic editor 102 detects a selection of a group operator 106 and an addition of operands as depicted by the logic group 104B. The transition from the empty logic group 104A presented on the interface to the logic group 104B is depicted by dashed line "1". All the operands within the logic group are combined using a group operator 106. In other words, the group operator 106 governs a default value for operators operating between consecutive pairs of operands in the logic group. The group operator 106 may differ from one logic group to another logic group. For example, an "AND" group operator may relate consecutive pairs of operands in the nested logic group, while an "OR" group operator may relate consecutive pairs of operands in the encapsulating logic group. As depicted in FIG. 1, an "AND" group operator 106 operates between consecutive pairs of operands within the logic group 104B The logic group 104B comprises three operands 110, 112, and 114. The operand 110 is "role is equal to teller", the operand 112 is "service len is >than 6 months", and the operand 114 is "service len is <or =9 months". Even though the operands 110, 112, and 114 comprise operands (role, service len, 6 months, and 9 months) and mathematical operators, they are operands from the perspective of the expression. The operator "< or =" depicted in the operand 114 is a common mathematical relationship generally depicted as "≤" or "<=". As depicted in the logic group 104B, the operands 110 and 112 are inputs to an "AND" operator 120. Similarly, the operands 112 and 114 are inputs to an "AND" operator 122. The operators 120 and 122 are, by default, set to "AND" based on the group operator 106 and relate two consecutive operands in the logic group 104B. Additionally, the operators may also operate between two nested logic groups. Depending on the complexity of the encapsulating Boolean expression, the operands of the encapsulating logic group can have multiple levels of nesting. For example, an operand (((A AND B) OR C)!D) of the encapsulating logic group can comprise three levels of nesting, with an innermost nested logic group (A AND B) within an intermediate nested logic group ((A AND B)OR C) within an outer nested logic group (((A AND B)OR C)!D).

At stage D, the Boolean logic editor 102 detects a change in an operator between two operands in the logic group 104B. As depicted in the logic group 104B, although the group operator 106 operates on each of the operands 110, 112, and 114 within the logic group 104B, the user has an option of changing either/both of the operators 120 and 122 that operate between the operands 110 and 112, and 112 and 114, respectively. In FIG. 1, the user clicks (depicted by mouse pointer 126) on the operator 122 and changes the operator 122 from an "AND" operator to an "OR" operator. The Boolean logic editor 102 can detect the change in the operator 122 ("modified operator") by monitoring user actions on the logic group 104B.

At stage E1, the Boolean logic editor 102 determines that the modified operator 122 (detected at stage D) operates on the last operand 114 in the logic group 104B. In one implementation, the Boolean logic editor 102 can access a logic database (not shown) to determine whether the operator 122 operates on the last operand in the logic group 104B. In another implementation, the Boolean logic editor 102 may determine whether the modified operator 122 is the last operator in the logic group 104B. In another implementation, the Boolean logic editor 102 may determine whether the last operand 114 is an input to the modified operator 122.

At stage F1, the Boolean logic editor 102 rearranges the operands to reflect the modified operator 122. The Boolean logic editor 102 rearranges the operands of the logic group 104B to graphically depict a desired evaluation order of the operands 110, 112, and 114. The Boolean logic editor 102 creates an encapsulating logic group 130 and selects group operator 132 such that the group operator 132 has the same value as the modified operator 122 (i.e., the "OR" operator). Thus, all operands added to the encapsulating logic group 130 will be combined using the group operator 132. The Boolean logic editor 102 creates logic group 104C by removing the operand 114 from the logic group 104B. Thus, the Boolean logic editor 102 breaks the logic group 104B into two parts—the logic group 104C (comprising the operands 110 and 112) and the operand 114. The Boolean logic editor adds the logic group 104C and the operand 114 to the encapsulating logic group 130. The encapsulating logic group 130 represents the Boolean expression presented on the interface. Dashed line "2" depicts a transition from the logic group 104B to the encapsulating logic group 130. In the encapsulating logic group 130, the logic group 104C is a nested logic group. As depicted in the encapsulating logic group 130, the operands 110 and 112 (which are a part of the nested logic group 104C) are inputs to the operator 120 (i.e., the "AND" operator). In evaluating the encapsulating logic group 130, the nested logic group 104C comprising "role is equal to teller AND service length is less than or equal to 6 months" is evaluated first, following which the nested logic group 104C and the operand 114 are evaluated using the operator 134. Although not necessary, the operator 134 is tied to the operator 132 (i.e., the operator 134 is controlled by the operator 132) in the depicted example. Hence, the illustration of FIG. 1 prevents user interaction with the operator 134 as depicted by a lack of a drop down menu associated with the operator 134, although embodiments can vary. The operator 134 may be modified by modifying (e.g., via the drop down menu) the operator 132.

Figure 2:
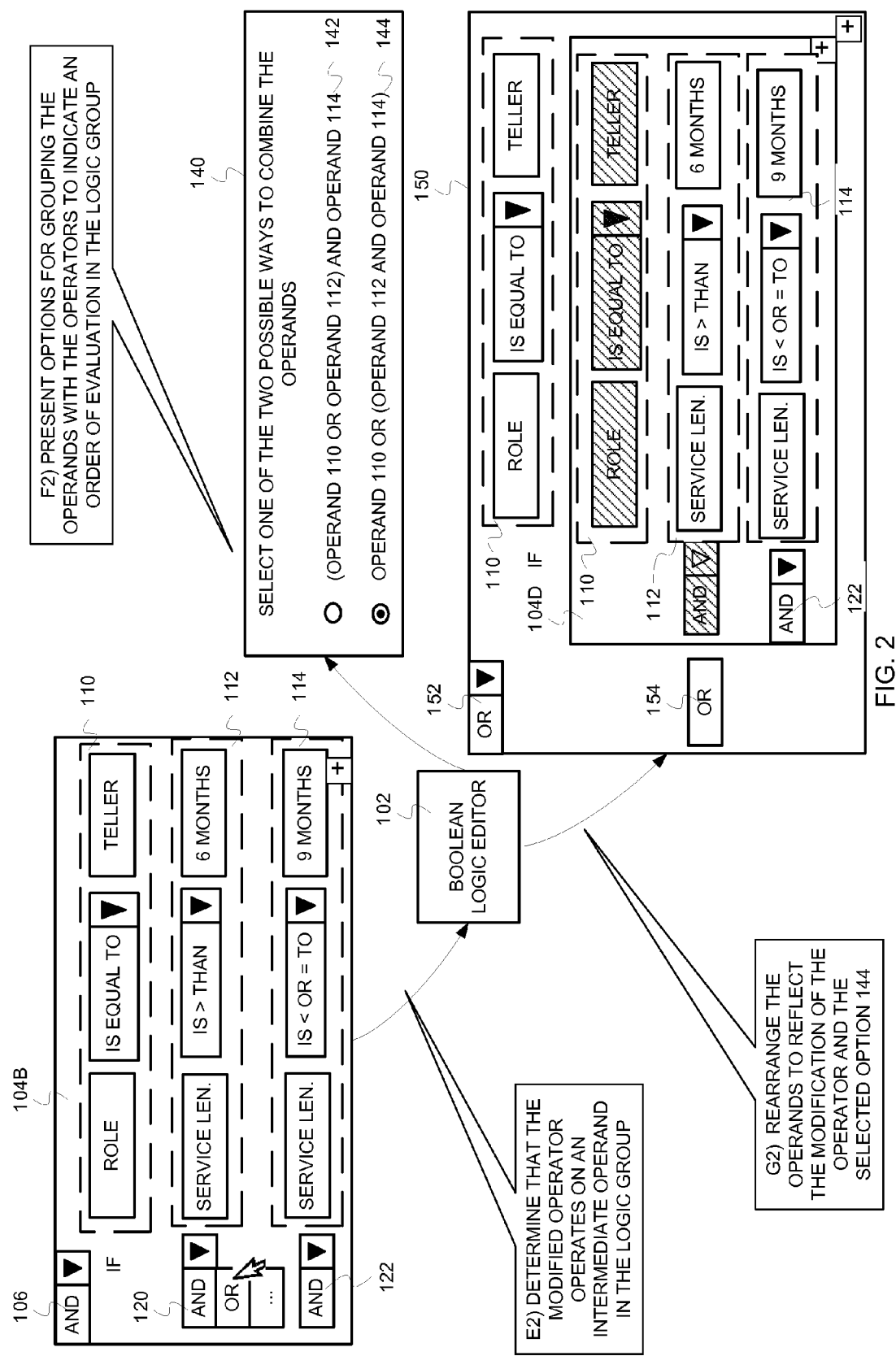
FIG. 2 is an example conceptual diagram illustrating the interface for creating Boolean logic expressions.

The Boolean logic editor 102 follows a slightly different sequence of operations if it is determined that the modified operator is not the last operator in the logic group 104B. These operations are illustrated in FIG. 2.

At stage E2, the Boolean logic editor 102 determines that the modified operator (detected at stage D) operates on an intermediate operand in the logic group 104B. As depicted in FIG. 2, the Boolean logic editor 102 determines that the operator 120 is modified. In one implementation, the Boolean logic editor 102 can access the logic database to determine that the operator 120 does not operate on the last operand of the logic group 104B. In another implementation, the Boolean logic editor 102 may determine that the modified operator 120 is not the last operator in the logic group 104B. In FIG. 2, the Boolean logic editor 102 determines that the modified operator 120 operates on the operands 110 and 112.

At stage F2, the Boolean logic editor 102 presents options for grouping the operands with the operators to indicate an order of evaluation for the operands in the logic group 104B. Modification of an intermediate operator can result in ambiguity regarding how the operands should be nested or an order in which the operands 110, 112, and 114 should be combined with the operators 120 and 122. As depicted on interface 140, the operands 110, 112, and 114 can be grouped differently and depending on the order in which the operands 110, 112, and 114 are evaluated, the evaluation can yield different results. In some implementations, in response to detecting the modification of the operator 120, the Boolean logic editor 102 may simulate evaluation of the Boolean expression represented by the logic group 104B. The Boolean logic editor 102 may identify ambiguities that may arise while evaluating the Boolean expression and identify multiple ways in which the operands and operators that comprise the Boolean expression can be evaluated. As depicted on the interface 140, there are two possible approaches to evaluating the Boolean expression. The first approach, designated as option 142, involves evaluating the Boolean expression such that the operands 110 and 112 are evaluated first using the modified operator 120, and passed as an input (along with the operand 114) to the operator 122. The second approach, designated as option 144, involves first grouping the operands 112 and 114 (using the "and" operator 122). The nested expression involving operands 112 and 114 and operator 122 is passed as an input (along with operand 110) to the modified operator 120. The Boolean logic editor 102 presents the above described options on the interface 140 and prompts the user to indicate how the operands should be grouped by selecting an evaluation order.

At stage G2, the Boolean logic editor 102 receives the user's selection (option 144) indicating how the operands should be grouped with the operators. Accordingly, the Boolean logic editor 102 rearranges the operands 110, 112, and 114 to reflect the modification of the operator 120 and the user's selection of option 144. The Boolean logic editor 102 rearranges the operands in accordance with the user's selection of option 144 to graphically depict a desired evaluation order of the operands within the logic group 104B. The Boolean logic editor 102 creates an encapsulating logic group 150 and selects group operator 152 such that the group operator 152 holds the same value ("OR" operator) as the modified operator 120. Thus, all of the operands added to the encapsulating logic group 150 will be combined using the group operator 152. The Boolean logic editor 102 creates a nested logic group (within the encapsulating logic group 150) by adding the logic group 104B. The logic group 104B when added to the encapsulating logic group 150 is depicted as the nested logic group 104D. Additionally, the Boolean logic editor 102 adds the operand 110 to the encapsulating logic group 150 and deletes the operand 110 from the nested logic group 104D as depicted by the dashed lines across the operand 110 in the nested logic group 104D. In the encapsulating logic group 150, the operands 112 and 114 (which are a part of the nested logic group 104D) are inputs to the operator 122 (i.e., the "AND" operator). In evaluating the encapsulating logic group 150, the nested logic group 104D comprising "service length is greater than 6 months AND service length is less than or equal to 9 months" is evaluated first, following which the nested logic group 104D and the operand 110 are evaluated using the operator 154. Also, the operator 154 is influenced by the operator 152 (i.e., the operator 154 is affected by a change in the operator 152 and vice versa). Therefore, in some implementations, user interaction with the operator 154 may not be permitted. This is depicted by a lack of a drop down menu associated with the operator 154. The operator 154 may be modified by modifying (e.g., via the drop down menu) the operator 152. In other implementations, user interaction with both the operators 152 and 154 (e.g., via a drop down menu) may be permitted.

It should be noted that the operations described with reference to FIGS. 1-2 are examples. For instance, although FIG. 2 depicts the logic group 104B comprising a combination of three operands 110, 112, and 114 and two operators 120 and 122, the logic group 104B can comprise any suitable number of operands and operators. As the number of operands and operators within the logic group increases, the number of combinations for grouping the operands and operators to remove ambiguity resulting from modifying the operators can also increase. In some implementations, more than one operator may be modified. Also, the encapsulating logic group may comprise multiple logic groups each with different group operators, multiple levels of nesting, etc. Moreover, the group operator may also be modified thus automatically changing the operators operating between each consecutive pair of the operands within the logic group.

Also, in FIGS. 1-2 the Boolean logic editor 102 indicates an evaluation order by depicting a rectangular solid-line box around the operands and operators that form the nested logic group. However, in some implementations, the operands and operators that form the nested logic group may be differentiated from those of the encapsulating logic group by depicting the nested logic group using different fonts, different font colors, different font emphasis, and other such visual styles and effects (e.g., shading effects, borders around the nested logic group, highlighting effects, etc). Moreover, in some implementations, the logic groups may not be associated with a group operator. Instead of selecting the group operator to automatically populate values of the operators, the user may manually select (e.g., by means of a drop down menu) requisite values of the operators. Before storing the Boolean expression, the Boolean logic editor 102 may simulate evaluation of the Boolean expression, identify different evaluation orders for the operators and their associated operands, and present a graphical representation of the user selected evaluation order for the operators and their associated operands.

Figure 3:
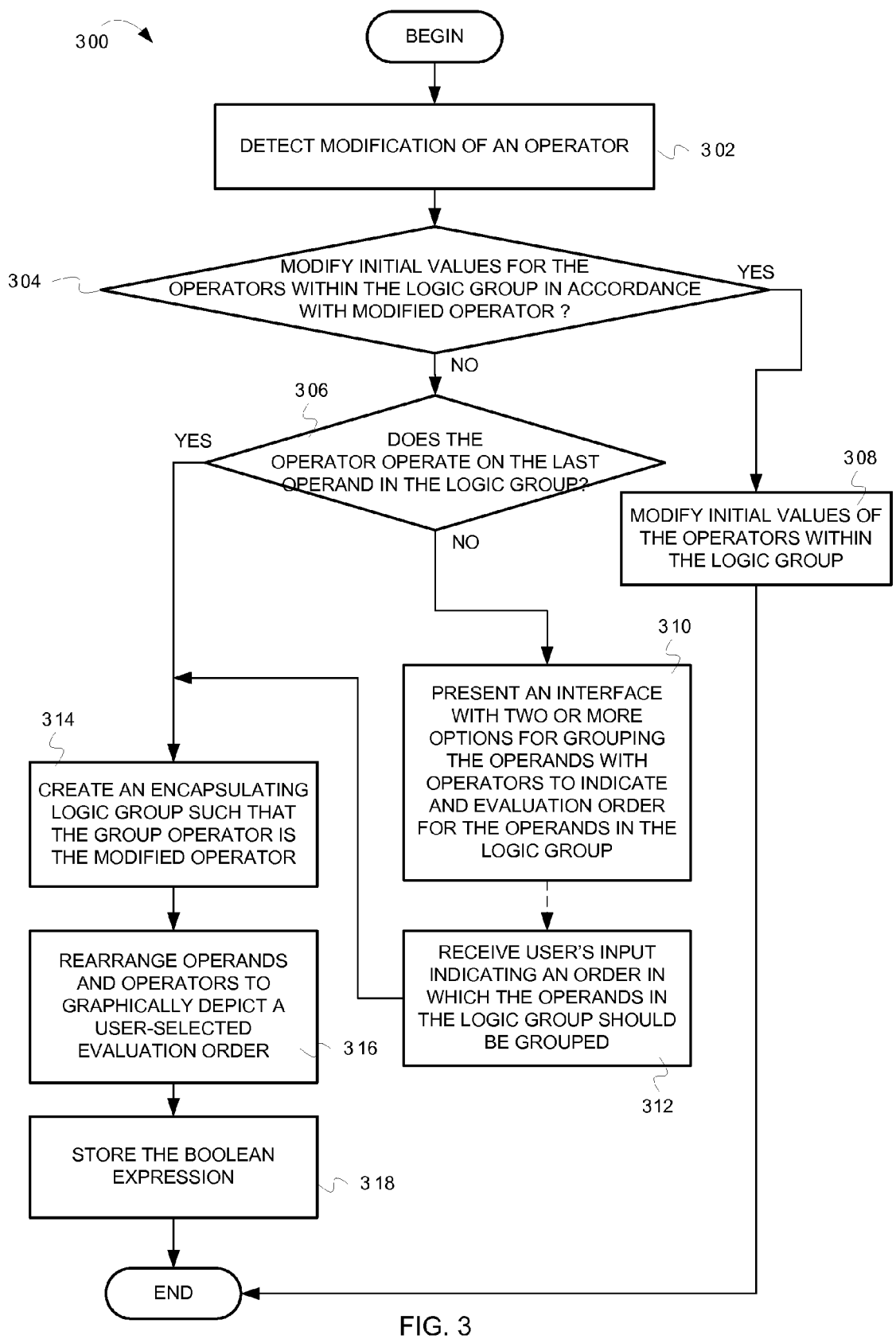
FIG. 3 is a flow diagram illustrating example operations for editing and presenting Boolean logic expressions.

FIG. 3 is a flow diagram illustrating example operations for editing and presenting Boolean logic expressions. Flow 300 begins at block 302.

A modification of an operator is detected (block 302). The modification of the operator can be detected by monitoring a user's actions on a Boolean logic editor interface. The Boolean logic editor interface can be used to edit existing Boolean expressions or to create new Boolean expressions. A Boolean logic editor can present the Boolean logic editor interface in response to detecting a request (e.g., a user launching an application, etc). The Boolean logic editor interface typically presents a logic group. The logic group comprises at least one operand and at least one operator and represents a Boolean expression which when evaluated yields a Boolean result. The logic group may also be associated with a group operator. The group operator sets initial values for operators that relate consecutive pairs of operands in the logic group. However, the values of the operators can be modified as described in the subsequent paragraphs. The flow continues at block 304.

It is determined whether the initial values for the operators within the logic group should be modified in accordance with the modified operator (block 304). As described earlier, the value of the group operator (e.g., the operator 106 in FIG. 1) sets the initial value for the operators (e.g., the operators 120 and 122) within the logic group. Modifying the group operator results in a modification of every operator in the logic group with which the group operator is associated. For example, referring to the logic group 104B of FIG. 1, changing the group operator 106 from "AND" to "OR" results in both of the operators 120 and 122 being changed from "AND" to "OR". If it is determined that the initial values for the operators within the logic group should be modified and that the modified operator is the group operator, the flow continues at block 308. Otherwise, the flow continues at block 306.

The initial values for the operators within the logic group are modified to reflect the detected modification of the operator (block 308). Modifying the group operator and hence each of the operators in the logic group may not change an order in which the operators and their associated operands are evaluated. From block 308, the flow ends.

It is determined whether the modified operator operates on a last operand of the logic group (block 306). The flow moves from block 304 to block 306 if it is determined that the modified operator is not the group operator. The operands in the logic group can be combined differently depending on whether or not the last operand of the logic group is one of the inputs to the modified operator. For example, if the modified operator operates between a first and a second of five operands, the order in which the five operands are grouped (e.g., grouping the second operand with a first operand vis-à-vis grouping the second operand with a third operand) using the modified operator can play an important part in yielding a desired result. If it is determined that the modified operator operates on the last operand of the logic group, the flow continues at block 314. Otherwise, the flow continues at block 310.

An interface with two or more options for grouping the operands with the operators to indicate an order of evaluation for the operands in the logic group is presented (block 310). In one implementation, evaluation of the Boolean expression represented by the logic group may be simulated to identify evaluation orders for the operators and their associated operands. Identifying evaluation orders may also involve identifying operands that are inputs to the operators.

Because the modified operator does not operate on the last operand of the logic group, evaluation of the operands in the logic group can yield different results depending on how the operands are combined using the modified operator. As an example, for a logic group with three operands and two operators, a modified first operator between a first and second operands, can be interpreted in one of two ways. In a first approach, the first and the second operands can be evaluated as inputs to the modified operator and can be represented as a nested logic group. The nested logic group and the third operand can be evaluated as inputs to the second operator. In the second approach, the second and the third operands can be evaluated as inputs to the second operator and can be represented as a nested logic group. The nested logic group and the first operand can be evaluated as inputs to the modified operator. The two approaches for grouping and evaluating the operands (described above) may be presented on the interface allowing the user to indicate an order in which the operators should be grouped with the operators.

Also, in addition to determining the evaluation orders for evaluating the operators and their associated operands, it may be determined (e.g., by the Boolean logic editor 102 of FIG. 1) that evaluating the operators and their associated operands in accordance with some of the identified evaluation orders yield the same result. For example, the Boolean logic editor may identify five evaluation orders according to which the operands and the operators can be evaluated. In simulating evaluation, the Boolean logic editor may also determine that four of the five identified evaluation orders yield the same result. Therefore, the Boolean logic editor may present one of the four evaluation orders that yield the same result. In other words, in presenting the two or more options for grouping the operands with the operators, the Boolean logic editor may present the options which when evaluated yield distinct results. In other implementations, the Boolean logic editor may present all the available evaluation orders without determining which (if any) of the evaluation orders yield the same result. The flow continues at block 312 after a user input is received (indicated by a dashed line between blocks 310 and 312).

The user input indicating the order in which the operands should be grouped with the operators is received (block 312). The user may choose one of the options presented on the interface by clicking on a GUI object (e.g., a button, selecting an option in a drop down menu, etc.), an audio input, etc. The flow continues at block 314.

An encapsulating logic group is created and a group operator for the encapsulating logic group is selected such that the group operator for the encapsulating logic group holds the same value as the modified operator (block 314). The encapsulating logic group is created to reflect grouping of operands with the operators and to indicate an order of evaluation. The flow continues at block 316.

The operands and operators are rearranged to graphically represent the user-selected evaluation order (block 316). The operands are rearranged based on a position of the modified operator (e.g., whether the modified operator operates on the last operand in the logic group) and the user-selected evaluation order for the operands (see description for block 312). For example, if it is determined that the last operand in the logic group is an input to the modified operator, the last operand in the logic group is added to the encapsulating logic group as one operand of the encapsulating logic group. Also, the last operand in the logic group is deleted from the logic group to obtain a "modified logic group". The modified logic group is added to the encapsulating logic group such that the modified logic group is a nested logic group within the encapsulating logic group and is another operand of the encapsulating logic group. Also, the group operator for the encapsulating logic group operates between the two operands of the encapsulating logic group. During evaluation, the Boolean expression represented by the nested logic group is evaluated first and is then used as an operand to evaluate an encapsulating expression represented by the encapsulating logic group.

Alternately, if it is determined that the modified operator does not operate on the last operand of the logic group, a first and second inputs for the modified operator are identified. The first and second inputs for the modified operator may be determined based on the indication of how the operands and operators should be combined (determined at block 312). In one implementation, an operand immediately preceding the modified operator may be the first input while an operand immediately following the modified operator may be the second input. The identified first and second inputs may be added to a nested logic group within the logic group, thus making the logic group the encapsulating logic group. The nested group may be created such that the modified operator relates the first and second inputs in the nested logic group. The identified first and second inputs may also be deleted from the encapsulating logic group. During evaluation, the identified first and second inputs in the nested logic group are evaluated first following which, the nested logic group is used as an operand to evaluate the encapsulating expression represented by the encapsulating logic group.

In another implementation, the first input to the modified operator can be a nested expression comprising a combination of all operands preceding the modified operator, while the second input to the modified operator can be a nested expression comprising a combination of all operands following the modified operator. Therefore, an encapsulating logic group comprising two nested logic groups may be created such that the modified operator relates the two nested groups. The identified first input comprising the combination of operands preceding the modified operator can be added to the first nested logic group, while the identified second input comprising the combination of operands following the modified operator can be added to the second nested logic group. After the operands and operators are rearranged to graphically represent the user-selected evaluation order, the flow continues at block 318.

The Boolean expression represented by the encapsulating logic group is stored (block 318). For example, the Boolean expression may be stored in a database. As another example, the Boolean expression may be stored in a structure. The stored Boolean expression may also be associated with information (metadata) describing an order in which the operands should be evaluated with the operators to yield the desired result. From block 318, the flow ends.

The stored Boolean expression may be used for controlling access to resources (e.g., files, web pages, etc.) based on information gathered from a resource access request (e.g., file name, requestor name, etc) or based on the requestor meeting certain requirements outlined in the Boolean expression. For example, an authorization unit on a system may receive a request for accessing a file and allow/block access to the file based on the request satisfying criteria specified by the Boolean expression. The authorization unit may deny access to the file if the Boolean expression evaluates to "false", while the authorization unit may allow access to the file if the Boolean expression evaluates to "true". The Boolean expression may also be used to perform content searches. For example, the Boolean expression may be used to search for audio files (e.g., on a computer system, on the internet, etc). The user may input a list of search criteria and a search engine may accordingly search for audio files that satisfy the criteria. For example, the Boolean expression for searching for audio files may be of the form:

```
IF genre IS EQUAL TO classical
AND (artist EQUAL TO Beethoven OR artist EQUAL TO Bach)
AND track_length EQUAL TO 3minutes
NOT track_name EQUAL TO moonlight sonata
```

The search engine may search for audio files using the above Boolean expression and present the audio files (or links to the files) that match the criteria specified in the Boolean expression.

Figure 4:
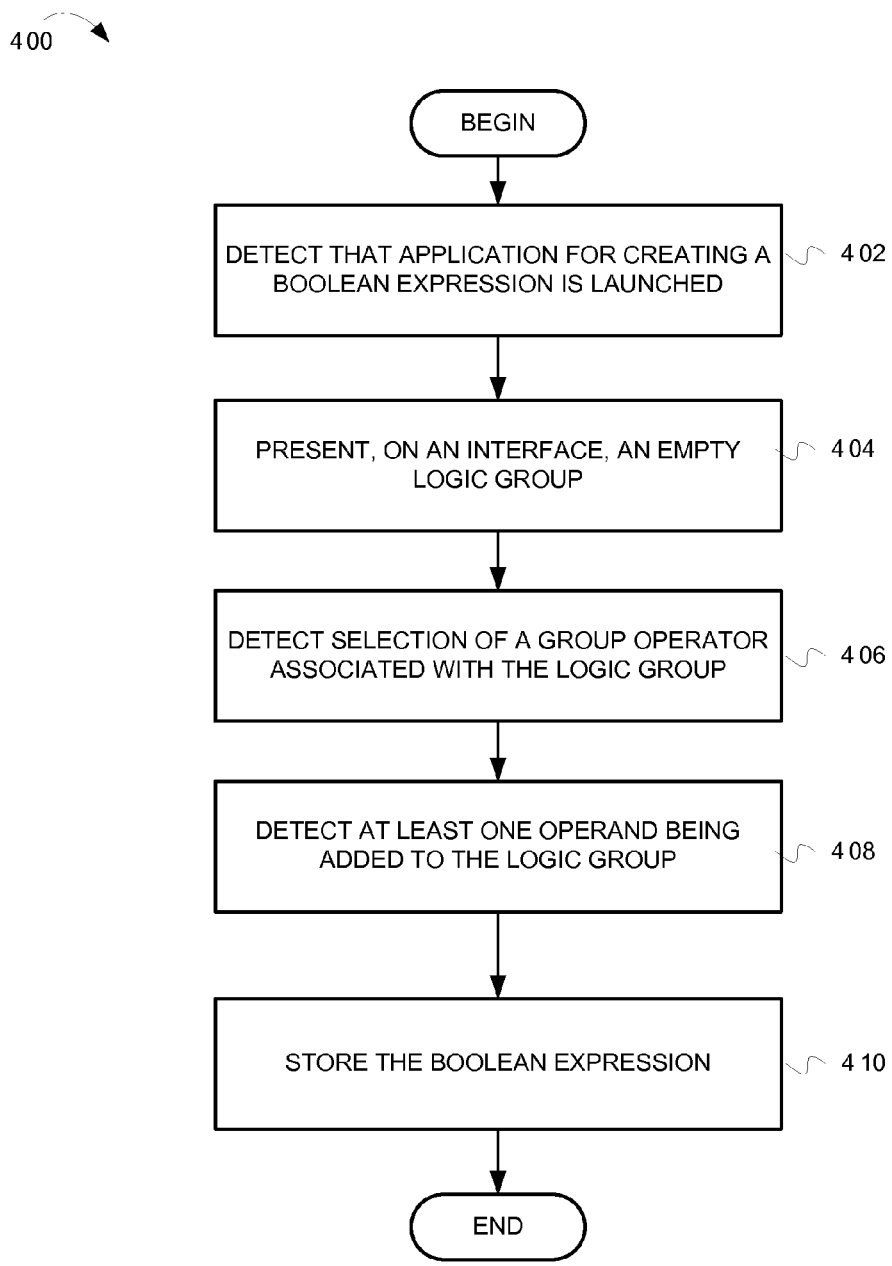
FIG. 4 is a flow diagram illustrating example operations for adding operands and operators to a logic group.

FIG. 4 is a flow diagram illustrating example operations for adding operands and operators to a logic group. Flow 400 begins at block 402.

An application for creating a Boolean expression is launched (block 402). The application for creating the Boolean expression may be launched to create/edit authorization policy to control access to resources. In some implementations, an interface for creating the Boolean expression may be presented in response to a user initiating a search request. The interface for creating the Boolean expression can also be used to set various search criteria (e.g., by indicating a group of characters in a file name, a date when the file was modified, etc.) to search for files (e.g., text documents, audio files, etc). The flow continues at block 404.

An empty logic group is presented on the interface (block 404). The logic group represents a combination of operands and operators. The logic group comprises at least one operand and at least one operator. As described earlier, a logic group can be nested within another logic group to create a nested logic group within an encapsulating logic group. The logic groups indicate an order in which the operands are grouped with the operators and an order of evaluation. Thus, the nested logic groups are evaluated first and are provided as operands to the encapsulating logic groups. The flow continues at block 406.

Selection of a group operator associated with the logic group is detected (block 406). The logic group can be structured so that the group operator (e.g., AND, OR, NOT, etc.) governs a default value of operators that relate consecutive pair of operands in the logic group. Users, however, can modify the operators in the logic group. Operations for modifying the Boolean expression and rearranging the evaluation order of the operands based on the modified operator are described with reference to FIG. 3. The flow continues at block 408.

It is detected that an operand is added to the logic group (block 408). A user can add the operand to the logic group by clicking on an "add operand" widget. In some implementations, the operand can be added to the logic group by dragging and dropping the operand into the logic group. The operand added to the logic group may be a nested logic group comprising a set of operands and operators. In some implementations, on clicking the add operand widget, another interface for selecting the operands may be presented. For example, an interface similar to the operand 110 in FIG. 1 may be presented. The user may have an option of selecting (e.g. via a drop down menu) or manually typing the operands. The flow continues at block 410.

The Boolean expression is stored (block 410). The Boolean expression may be stored in a database, in a structure on a server, etc. and may be used by an authorization unit to control access to resources. Boolean expressions for performing content searches may also be stored for further use. Additionally, metadata for the Boolean expression may also be stored (e.g., in a separate file, in a data structure, etc). The metadata may describe a sequence in which the operands should be evaluated. For example, the metadata may indicate a following order of evaluation 1) evaluate a second and third operand as input to an OR operator, 2) evaluate a fourth and fifth operand as input to an OR operator, and 3) provide nested expressions in (1) and (2) as inputs to an "AND" operator. The authorization unit, a search engine or other software/hardware configured to evaluate the Boolean expression can retrieve the stored Boolean expression, access the associated metadata, determine the order in which the operands of the Boolean expression should be evaluated, and accordingly evaluate the Boolean expression. The stored Boolean expression can be edited in accordance with operations described with reference to FIG. 3. From block 410, the flow ends.

It should be noted that the operations described in the flow diagrams (FIGS. 3-4) are examples meant to aid in understanding embodiments, and should not be used to limit embodiments or limit scope of the claims. Embodiments may perform additional operations, fewer operations, operations in a different order, operations in parallel, and some operations differently. For example, on detecting a modification of an operand (e.g., role, teller, 6 months, is equal to, etc. as indicated in FIG. 1), the new values of the operand may be captured, the logic group may be modified to reflect the new values, and the new values may be stored. The evaluation order of the operands within the logic group may not be affected.

Also, the operations described in FIGS. 3-4 may be performed successively. For example, a modification of an operator may be detected (as described in the flow 300) after the operands and operators are added to the logic group (as described in the flow 400).

In some implementations, two or more operands in the logic group may be nested logic groups. For example, in the Boolean expression "(A AND B) OR (!C AND D)", the two operands (i.e. (A AND B) and ((! C) AND D) for the "OR" operator are nested expressions within the encapsulating Boolean expression "(A AND B) OR (!C AND D)". In terms of logic groups, the nested expression (A AND B) may be represented by a first nested logic group while the nested expression (!C AND D) may be represented by a second nested logic group. The expression (!C) may be represented a third nested logic group within the second nested logic group. The first and the second nested logic groups are encapsulated within the encapsulating logic group. Although the first and the second nested logic groups should be evaluated before the encapsulating logic group can be evaluated, the order in which the first and the second nested logic groups are evaluated may not matter. In one implementation, the first nested logic group can be evaluated before the second nested logic group. In another implementation, the second nested logic group can be evaluated before the first nested logic group. In another implementation, the first and the second logic groups can be evaluated in parallel. However, the third nest logic group comprising the (!C) expression should be evaluated before evaluating the second nested logic group because evaluation of the second nested logic group relies on the evaluation of the third nested logic group.

It should also be noted that although FIG. 3 describes rearranging the operands and operators to reflect the evaluation order (see block 316), the physical order in which the operands are stored may not be rearranged. For example, the operands may be stored in an order in which they were added to the Boolean logic group and the metadata may be used to indicate an order in which the operators and their associated operands should be evaluated.

In some implementations, operands and operators that form a part of nested expressions may be highlighted to indicate that the nested expressions are evaluated before being provided to the encapsulating expression. Referring to FIG. 1, the nested expression 104C is demarcated by a solid line rectangular box. However, in other implementations, evaluation order of the nested expressions may be graphically depicted by using different colors, different font sizes, different font emphasis, and other visual styles and effects. For example, the nested expression may be in a bold font while the encapsulating expression may be in an italicized font.

Also, although FIG. 4 refers to detecting a selection of a group operator (see block 406), in some implementations, the logic group may not be associated with a group operator. Instead, the user may manually select (e.g., by means of a drop down menu) requisite values of the operators. The operations for determining whether the Boolean expression is ambiguous and results in multiple evaluation orders for the operators and their associated operands may be performed when a new operand is added to the logic group, an operator is selected, or an operator is modified.

Lastly, although FIG. 3 refers to receiving the user input indicating the evaluation order for the operands and the operators (see block 312), in some implementations, the evaluation order may be determined (e.g., by the Boolean logic editor 102 of FIG. 1) based on consulting a set of rules. The set of rules may indicate priorities for the operators. For example, the set of rules may indicate that an "AND" operator should be evaluated before an "OR" operator. Thus, if an ambiguity arises over whether an AND operator and an OR operator should be evaluated first, an evaluation order that first evaluates the AND operator and its associated operands may automatically be chosen.

Figure 5:
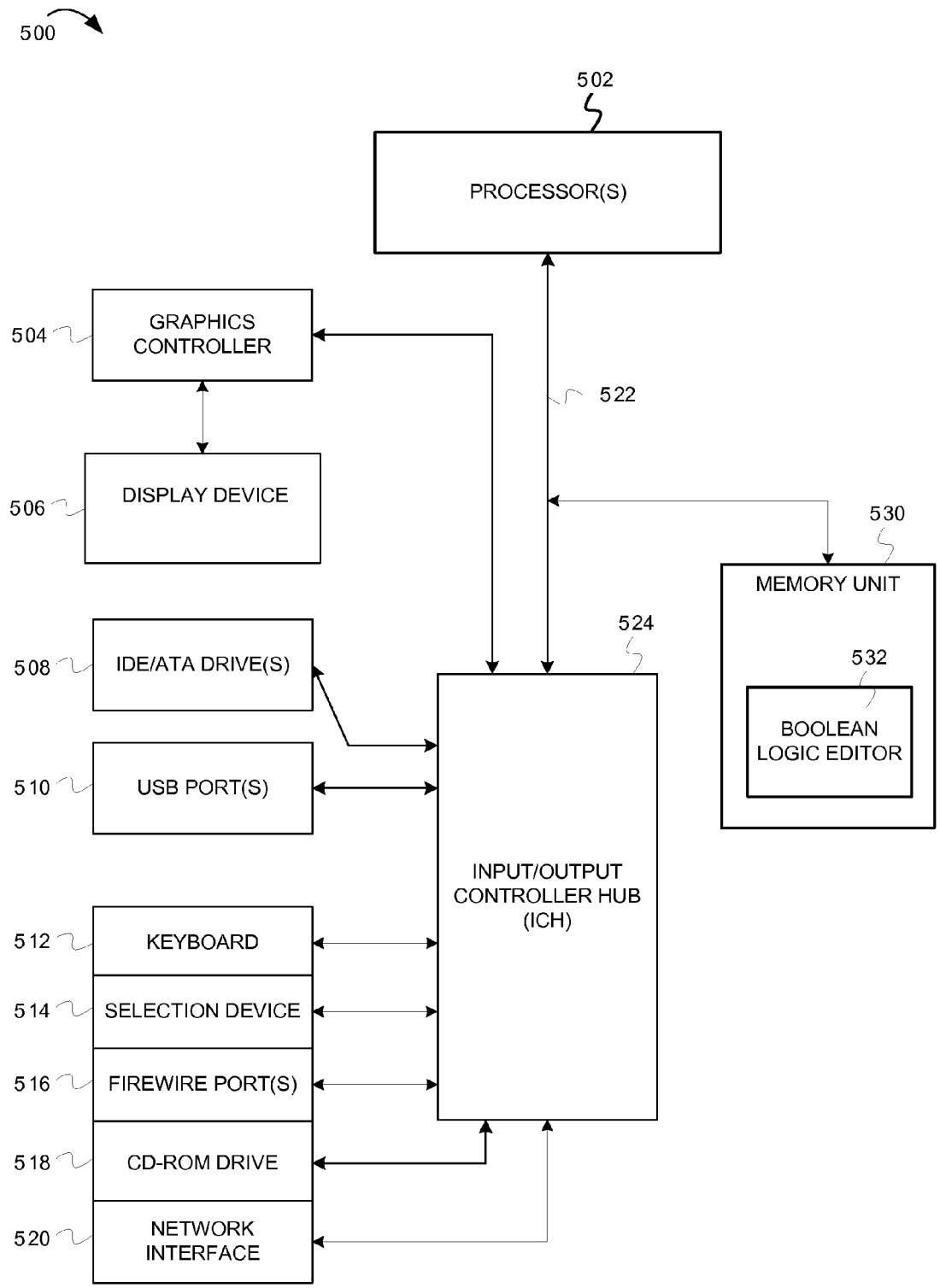
FIG. 5 is an example computer system configured for editing and presenting Boolean logic.

FIG. 5 is an example computer system 500 configured for editing and presenting Boolean logic. The computer system 500 includes a processor 502. The processor 502 is connected to an input/output controller hub 524 (ICH), also known as a south bridge, via a bus 522 (e.g., PCI, ISA, PCI-Express, HyperTransport, etc). A memory unit 530 interfaces with the processor 502 and the ICH 524. The main memory unit 530 can include any suitable random access memory (RAM), such as static RAM, dynamic RAM, synchronous dynamic RAM, extended data output RAM, etc The memory unit 530 comprises a Boolean logic editor 532. The Boolean logic editor 532 embodies functionality described in accordance with FIGS. 1-4. The Boolean logic editor 532 presents an interface by which Boolean expressions comprising at least one operand and at least one operator can be created or edited. On detecting a request to modify an operator, the Boolean logic editor 532 determines whether a current evaluation order for the operands is ambiguous. The Boolean logic editor 532 can identify different approaches to evaluating the Boolean expression and present a set of options for the different evaluation approaches. The Boolean logic editor 532 can prompt the user to choose an order in which the operands in the Boolean expression should be evaluated to avoid ambiguity and to achieve the desired result.

The ICH 524 connects and controls peripheral devices. In FIG. 5, the ICH 524 is connected to IDE/ATA drives 508 and to universal serial bus (USB) ports 510. The ICH 524 may also be connected to a keyboard 512, a selection device 514, firewire ports 516, CD-ROM drive 518, and a network interface 520. The ICH 524 can also be connected to a graphics controller 504. The graphics controller is connected to a display device 506 (e.g., monitor). In some embodiments, the computer system 500 can include additional devices and/or more than one of each component shown in FIG. 5 (e.g., video cards, audio cards, peripheral devices, etc.). For example, in some instances, the computer system 500 may include multiple processors, multiple cores, multiple external CPU's. In other instances, components may be integrated or subdivided.

As will be appreciated by one skilled in the art, aspects of the present inventive subject matter may be embodied as a system, method, or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, the interface for creating and editing Boolean logic expressions as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    detecting a manipulation of a graphical depiction of a plurality of operands and a plurality of operators of a Boolean expression on a Boolean logic editing interface;
    responsive to said detecting the manipulation of the graphical depiction of the plurality of operands and the plurality of operators of the Boolean expression on the Boolean logic editing interface, determining an ambiguity in evaluation of the Boolean expression depicted by the Boolean logic editing interface, wherein the ambiguity in the evaluation of the Boolean expression allows the Boolean expression to be evaluated in accordance with a plurality of evaluation orders, wherein the plurality of evaluation orders arise in response to the manipulation of the graphical depiction of the plurality of operands and the plurality of operators of the Boolean expression;

presenting, on the Boolean logic editing interface, the plurality of evaluation orders in response to said determining the ambiguity in the evaluation of the Boolean expression that allows the Boolean expression to be evaluated in accordance with the plurality of evaluation orders;

determining, based on user input, a selection of a first of the plurality of evaluation orders; and updating the graphical depiction of the plurality of operands and the plurality of operators of the Boolean expression to graphically depict the first of the plurality of evaluation orders, wherein the Boolean expression is evaluated in accordance with the first of the plurality of evaluation orders.

2. The method of claim 1, wherein the manipulation comprises at least one of changing an operator, adding an operator, changing an operand, and adding an operand, wherein a first of the plurality of operands comprises a nested expression.

3. The method of claim 1, wherein the determining the ambiguity in evaluation of the Boolean expression depicted by the Boolean logic editing interface further comprises simulating evaluation of the Boolean expression to identify the plurality of evaluation orders that provide different results.

4. The method of claim 1, wherein the determining the selection of the first of the plurality of evaluation orders is in response to one of a user selection of the first of the plurality of evaluation orders and consulting a set of rules for selecting one of the plurality of evaluation orders.

5. The method of claim 1, wherein the determining the ambiguity in evaluation of the Boolean expression depicted by the Boolean logic editing interface further comprises determining associations between the plurality of operands and the plurality of operators based, at least in part, on detecting the manipulation of the Boolean logic editing interface.

6. The method of claim 1, wherein the updating the graphical depiction of the plurality of operands and the plurality of operators that comprise the Boolean expression to graphically depict the first of the plurality of evaluation orders further comprises rearranging the plurality of operands and the plurality of operators in accordance with the first of the plurality of evaluation orders.

7. The method of claim 1, wherein the manipulation of the Boolean logic editing interface comprises changing a first of the plurality of operators.

8. The method of claim 1, wherein the updating the graphical depiction of the plurality of operands and the plurality of operators that comprise the Boolean expression to graphically depict the first of the plurality of evaluation orders comprises at least one of varying a font color, varying a font size, varying a font emphasis, and applying visual styles and visual effects to some of the plurality of operands and some of the plurality of operators.

9. A computer program product for creating and editing Boolean logic expressions, the computer program product comprising:

a non-transitory computer readable storage medium having computer readable program code embodied therewith, the computer readable program code configured to:

detect a manipulation of a graphical depiction of a plurality of operands and a plurality of operators of a Boolean expression on a Boolean logic editing interface;

responsive to detection of the manipulation of the graphical depiction of the plurality of operands and the plurality of operators of the Boolean expression on the Boolean logic editing interface, determine an ambiguity in evaluation of the Boolean expression depicted by the Boolean logic editing interface, wherein the ambiguity in the evaluation of the Boolean expression allows the Boolean expression to be evaluated in accordance with a plurality of evaluation orders, wherein the plurality of evaluation orders arise in response to the manipulation of the graphical depiction of the plurality of operands and the plurality of operators of the Boolean expression;

present, on the Boolean logic editing interface, the plurality of evaluation orders in response to the computer readable program code determining the ambiguity in the evaluation of the Boolean expression that allows the Boolean expression to be evaluated in accordance with the plurality of evaluation orders;

determine, based on a user input, a selection of a first of the plurality of evaluation orders; and update the graphical depiction of the plurality of operands and the plurality of operators of the Boolean expression to graphically depict the first of the plurality of evaluation orders, wherein the Boolean expression is evaluated in accordance with the first of the plurality of evaluation orders.

10. The computer program product of claim 9, wherein the manipulation comprises at least one of changing an operator, adding an operator, changing an operand, and adding an operand, wherein a first of the plurality of operands comprises a nested expression.

11. The computer program product of claim 9, wherein the computer readable program code configured to determine the ambiguity in evaluation of the Boolean expression depicted by the Boolean logic editing interface further comprises the computer readable program code configured to simulate evaluation of the Boolean expression to identify the plurality of evaluation orders that provide different results.

12. The computer program product of claim 9, wherein the computer readable program code configured to update a graphical depiction of the plurality of operands and the plurality of operators that comprise the Boolean expression to graphically depict the first of the plurality of evaluation orders further comprises the computer readable program code configured to rearrange the plurality of operands and the plurality of operators in accordance with the first of the plurality of evaluation orders.

13. The computer program product of claim 9, wherein the computer readable program code configured to update the graphical depiction of the plurality of operands and the plurality of operators that comprise the Boolean expression to graphically depict the first of the plurality of evaluation orders further comprises the computer readable program code configured to vary a font color, vary a font size, vary a font emphasis, and apply visual styles and visual effects to some of the plurality of operands and some of the plurality of operators.

14. A computer program product for authoring Boolean logic expressions, the computer program product comprising:

a non-transitory computer readable storage medium having computer readable program code embodied therewith, the computer readable program code configured to:

detect a manipulation of a graphical depiction of a plurality of operands and a plurality of operators of a Boolean expression on a Boolean logic editing interface;

responsive to detection of the manipulation of the graphical depiction of the plurality of operands and the plurality of operators of the Boolean expression on the Boolean logic editing interface, determine an ambiguity in evaluation of the Boolean expression depicted with the Boolean logic editing interface, wherein the ambiguity in evaluation of the Boolean expression allows the Boolean expression to be evaluated in accordance with a plurality of evaluation orders, wherein the plurality of evaluation orders arise in response to the manipulation of the graphical depiction of the plurality of operands and the plurality of operators of the Boolean expression;

present, on the Boolean logic editing interface, the plurality of evaluation orders in response to the computer readable program code determining the ambiguity in the evaluation of the Boolean expression that allows the Boolean expression to be evaluated in accordance with the plurality of evaluation orders;

determine, based on a user input, a selection of a first of the plurality of evaluation orders; and rearrange the plurality of operands and the plurality of operators of the Boolean expression to graphically depict the first of the plurality of evaluation orders.

15. The computer program product of claim 14, wherein the manipulation comprises at least one of changing an operator, adding an operator, changing an operand, and adding an operand, wherein a first of the plurality of operands comprises a nested expression.

16. The computer program product of claim 14, wherein the computer readable program code configured to determine the selection of the first of the plurality of evaluation orders is in response to one of the computer readable program code determining a user selection of the first of the plurality of evaluation orders and the computer readable program code consulting a set of rules for selecting one of the plurality of evaluation orders.

17. The computer program product of claim 14, wherein the computer readable program code configured to determine the ambiguity in the evaluation of the Boolean expression depicted by the Boolean logic editing interface further comprises the computer readable program code configured to determine associations between the plurality of operands and the plurality of operators based, at least in part, on the computer readable program code detecting the manipulation of the Boolean logic editing interface.

18. An apparatus comprising:
a processor;
a network interface coupled with the processor;
a Boolean logic editor operable to,
detect a manipulation of a graphical depiction of a plurality of operands and a plurality of operators of a Boolean expression on a Boolean logic editing interface;

responsive to detection of the manipulation of the graphical depiction of the plurality of operands and the plurality of operators of the Boolean expression on the Boolean logic editing interface, determine an ambiguity in evaluation of the Boolean expression depicted by the Boolean logic editing interface, wherein the ambiguity in the evaluation of the Boolean expression allows the Boolean expression to be evaluated in accordance with a plurality of evaluation orders, wherein the plurality of evaluation orders arise in response to the manipulation of the graphical depiction of the plurality of operands and the plurality of operators of the Boolean expression;

present, on the Boolean logic editing interface, the plurality of evaluation orders in response to the computer readable program code determining the ambiguity in the evaluation of the Boolean expression that allows the Boolean expression to be evaluated in accordance with the plurality of evaluation orders;

determine, based on a user input, a selection of a first of the plurality of evaluation orders; and update the graphical depiction of the plurality of operands and the plurality of operators of the Boolean expression to graphically depict the first of the plurality of evaluation orders.

19. The apparatus of claim 18, wherein the Boolean logic editor operable to determine the ambiguity in evaluation of the Boolean expression depicted by the Boolean logic editing interface further comprises the computer readable program code configured to simulate evaluation of the Boolean expression to identify the plurality of evaluation orders that provide different results.

20. The apparatus of claim 18, wherein the Boolean logic editor comprises machine-readable storage media.

\* \* \* \* \*